Aug. 6, 1946.                A. F. FUKAL                 2,405,418
                              GLOBE
                       Filed Dec. 11, 1944
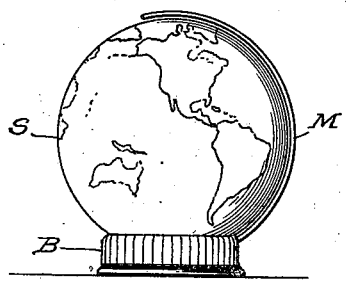
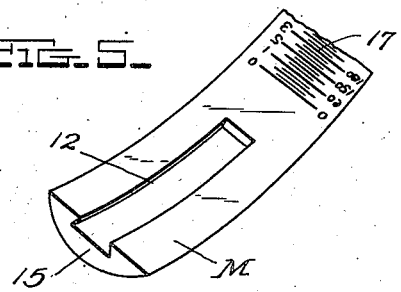
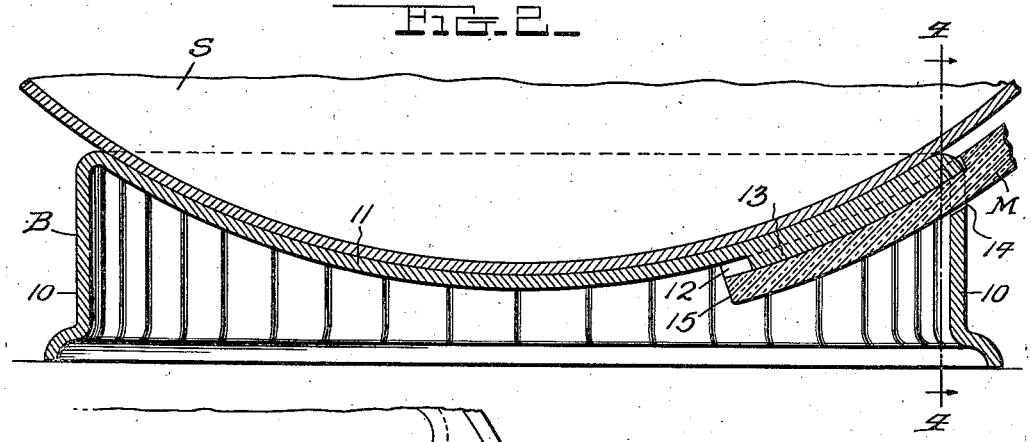
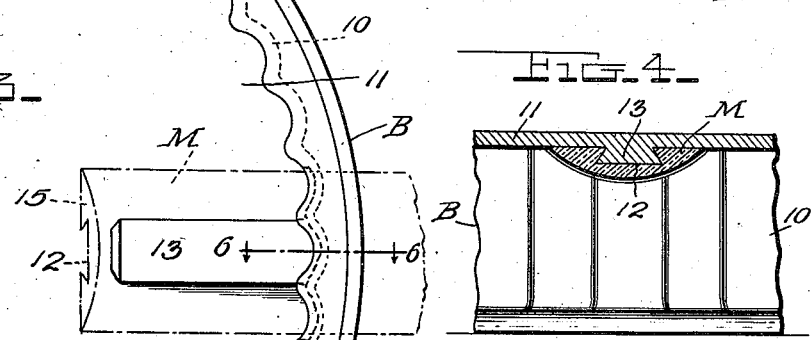
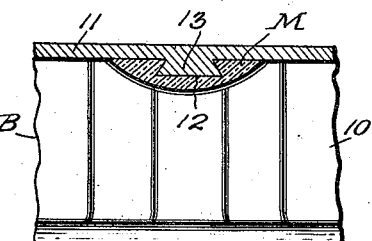
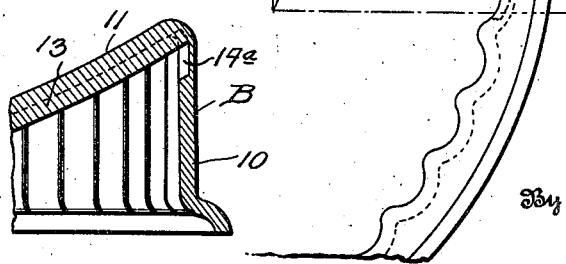
Inventor
Alfred F. Fukal.
By Mason, Porter & Diller,
Attorneys.

Patented Aug. 6, 1946

2,405,418

UNITED STATES PATENT OFFICE 2,405,418

GLOBE

Alfred F. Fukal, Cambridge, Ohio, assignor to Continental Can Company, Inc., New York, N. Y., a corporation of New York Application December 11, 1944, Serial No. 567,595

6 Claims. (Cl. 35—46)

This invention is concerned with a globe including a spherical member and a stand and retaining member.

A feature of the invention is the provision of structural elements which may be easily molded of material such as plastics, and assembled or disassembled at the convenience of the owner.

Another feature of the invention is the provision of a scale member for permitting determination of a great circle line on the sphere, together with means for permitting an enlarged representation of parts of the globe beneath the scale arm.

A further feature of the invention is the provision of a simple and positive securing means for attaching the scale arm in position whereby it is supported on the base and the sphere is permitted to be moved beneath it, and in which the scale member serves for securing the sphere against accidental separation from the stand.

With this and other features in view, as will appear in the course of the following description and claims, an illustrative form of the invention is shown in the accompanying drawing, in which:

Figure 1 is a side elevation of the globe assembly of sphere, stand and scale arm;

Figure 2 is an upright sectional view, on an enlarged scale, through the stand, and through the lower parts of the scale arm and sphere;

Figure 3 is a fragmentary bottom view of the stand;

Figure 4 is an upright sectional view substantially on the line 4—4 of Figure 2;

Figure 5 is a perspective view of the lower end of the scale arm, and

Figure 6 is an upright sectional view through a portion of the stand, substantially on line 6—6 of Figure 3.

In this drawing, the sphere S is illustrated as having delineations thereon in accordance with the purpose to be served. In Figure 1, the delineations provide a map of the world.

A stand B is provided, which likewise may be molded of plastic material, with a peripheral wall 10 which is illustrated as being scalloped or corrugated in its horizontal section, for greater stiffness. This peripheral wall is shown in the drawing as molded or formed with a bed 11, which has its upper or outer surface conformed to the outer surface of the sphere for loosely receiving the same and permitting the sphere to be moved to any desired position by rotation about any axis. In the illustrated form, the bed 11 forms a complete upper closing wall for the peripheral wall 10; but may be cored out if desired to save material.

A scale member or arm M is illustrated as extending past the top of the sphere S, so that the assembly of the scale member M and the base B embraces more than 180 degrees around the sphere S and thus provides means for preventing accidental separation of the sphere S from its base B.

As shown in Figure 5, the lower end of the scale member is provided with means for interengaging with the base for holding the scale member M fixedly in position. In Figure 5, the lower end of the scale member M has a dove-tail slot 12 extending from its end. The undersurface of the bed 11 is correspondingly provided with a dove-tail projection 13 (Figures 2–4) for interengagement with the dove-tail slot 12. By having the dove-tails curved with the arcuate part of the scale member and thus about the general center of the spherical member, the parts are better retained than by having the dove-tail section directed as a rectilinear tangent to this arc. When the scale member is formed of plastic, it can be sprung slightly by hand for removing the sphere from the stand, if so desired, without detaching the scale member.

A part of the peripheral wall 10 is cut away to provide an opening 14 through which the scale member M may penetrate while engaged slidingly with the dove-tail projection 13.

The scale member 10 is preferably of uniform lenticular cross section as shown by the extreme end 15 in Figures 3, 4 and 5. The scale member may be made from transparent plastic material having a flat surface and an opposite cylindrically shaped surface, providing the same with the dove-tail slot 12, and the scale markings 17 at the plane side, and having the arcuate form shown in Figure 1 with its inner surface of greater radius than the radius of the sphere, so that it is held concentric with the sphere but spaced therefrom.

The engraved scale markings 17 may be numbered to indicate air or sea miles, degrees, etc. By moving the sphere so that any two places appear beneath the longitudinal scale of the scale member, their distance may be read off readily.

As shown in Figure 6, the stand can be manufactured with a peripheral wall having a closed external surface, but with a cavity 14ª at the interior corresponding to the location of the aperture 14. The stand can then be employed without the scale arm; and has a uniform external appearance. When the owner desires to attach and use the scale arm M, the thinned wall can be punched out, at this weakened place, to provide the aperture 14.

It is obvious that the invention is not limited to the illustrative form shown, but that it may be modified in many ways within the scope of the appended claims.

I claim:

1. A globe comprising a spherical member having delineations thereon, a stand having a spherical bed for loosely receiving the spherical member and having a peripheral wall connected to the bed and providing a supporting base, and a scale member of arcuate form extending over the surface of the spherical member for holding the same on the stand and for permitting scale readings between parts of said delineations, said scale member being connected to the stand and being transparent and having a lenticular cross-section for optically enlarging the said delineations.

2. A globe comprising a spherical member having delineations thereon, a stand having a spherical bed for loosely receiving the spherical member and having a peripheral wall connected to the bed and providing a supporting base, and a scale member of arcuate form extending over the surface of the spherical member for holding the same on the stand and for permitting scale readings between parts of said delineations, said scale member being transparent and having a substantially cylindrical inner surface with scale markings and an outer surface which is convex in cross-section for optically enlarging the said delineations, the lower end of the scale member having a dove-tail curved from end to end, the lower surface of the bed having a dove-tail for interengaging with the dove-tail on the scale member, the peripheral wall having an opening for the passage of the scale member.

3. A globe comprising a spherical member having delineations thereon, a stand having a spherical bed for loosely receiving the spherical member and providing a supporting base therefor, and a single retaining member of transparent material having from end to end an arcuate form essentially concentric with the spherical member when positioned on the stand, the lower end of said retaining member and said stand having dovetail parts for sliding interengagement essentially concentric with the spherical member whereby the retaining member is held in position, the stand and retaining member embracing more than 180 degrees around the spherical member for holding the spherical member in position on the stand, the retaining member being constructed and arranged with respect to the surface of the spherical member and having a lenticular cross-section at the portion above the stand whereby to optically enlarge said delineations.

4. A globe comprising a spherical member having delineations thereon, a stand having a wall providing a spherical bed for loosely receiving the spherical member and having a peripheral wall connected to the bed wall and providing a supporting base; and a retaining member of resilient material having the form of an arcuate bar extending over the surface of the spherical member to the top thereof, the stand and retaining member being so constructed and arranged and the lower end of the retaining member and the lower surface of the bed wall having sliding interengageable parts whereby the retaining member is secured to the stand that the stand and retaining member are effective for resisting movement of the spherical member away from said bed, the material of said retaining member being resiliently flexible whereby to permit springing for removal of the spherical member from the stand without detaching the retaining member.

5. A globe comprising a spherical member having delineations thereon, a stand having a wall providing a spherical bed for loosely receiving the spherical member and having a peripheral wall connected to the bed and providing a supporting base, and a scale member of arcuate form extending over the surface of the spherical member for holding the same on the stand and for permitting scale readings between parts of said delineations, said peripheral wall having an opening to receive the lower end of the scale member and said bed wall having a dovetail portion on its lower surface in alignment with said opening, said scale member having its lower end constructed and arranged whereby to enter the opening and to interengage with said dovetail portion and thereby to be secured to said stand, said dovetail portion and said lower end being curved essentially concentric with the spherical member.

6. A globe stand for a spherical member comprising a wall providing a spherical bed for loosely receiving the spherical member and an apertured peripheral wall connected to the bed wall; and a retaining member having the form of an arcuate bar, the lower end of the retaining member and the lower surface of the bed wall having parts constructed and arranged for interengagement by sliding in a direction essentially parallel to said bed and by movement of the bar through an aperture in said peripheral wall whereby the retaining member is secured to said walls.

ALFRED F. FUKAL.